No. 863,536.
PATENTED AUG. 13, 1907.
E. A. HUDSON.
SKILLET.
APPLICATION FILED APR. 21, 1906.
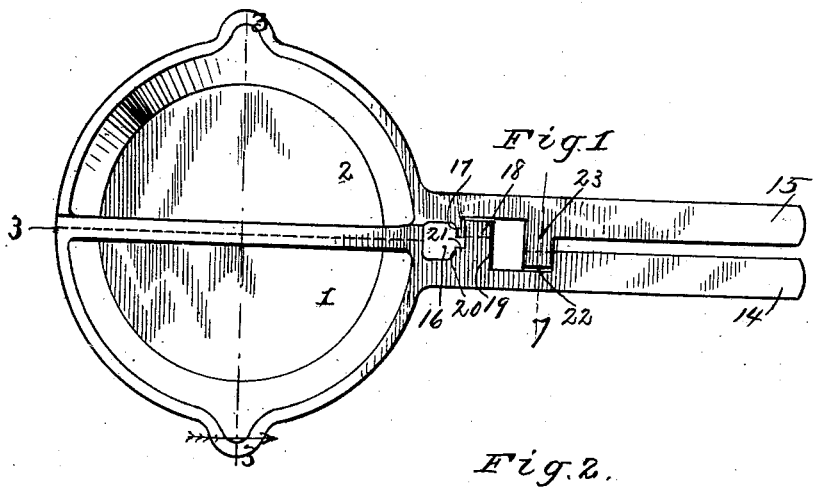
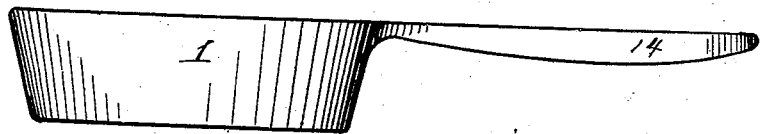
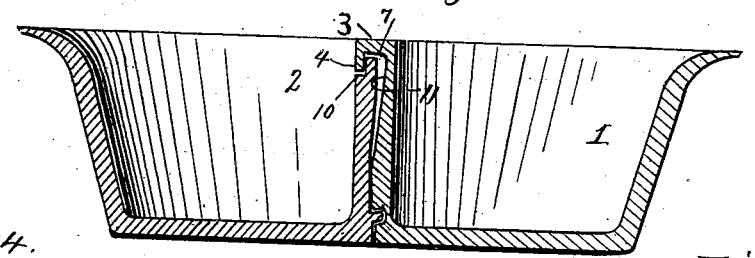
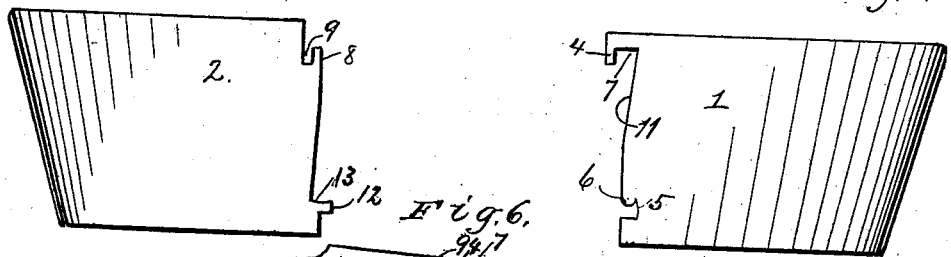
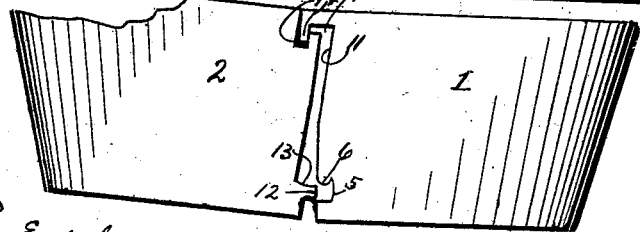
Witnesses
W. Rees Edelen
John S. Downs
Inventor
E. A. Hudson
By Shepherd & Parker, Attorneys

UNITED STATES PATENT OFFICE.

EDWARD A. HUDSON, OF OQUAWKA, ILLINOIS.

SKILLET.

No. 863,536.  Specification of Letters Patent.  Patented Aug. 13, 1907.

Application filed April 21, 1906. Serial No. 313,039.

*To all whom it may concern:*

Be it known that I, EDWARD A. HUDSON, a citizen of the United States, residing at Oquawka, in the county of Henderson and State of Illinois, have invented certain new and useful Improvements in Skillets, of which the following is a specification.

This invention relates to new and useful improvements in cooking utensils and it particularly pertains to a skillet, frying pan or like article embodying independent receptacles which may be used conjointly in attached relation or used singly in detached relation.

The invention aims to provide a device in which different foods may be simultaneously cooked and in the event of a food in one receptacle being cooked before the food in the other receptacle, the receptacle containing the cooked food can be quickly and easily detached from the other receptacle by a manual operation.

In connection with a device of the above type, the invention aims to facilitate the assemblage and disassemblage of the cooking receptacles by providing the adjacent sides thereof with complementary locking elements, which interfit one another in such a manner that the elements may be disengaged from their locking relation by a relative movement of the two receptacles, and without necessarily removing them from the stove.

The detailed construction will appear in the course of the following description in which reference is to the accompanying drawing forming a part of the specification, like numerals designating like parts throughout the several views, wherein Figure 1 is a top plan view, showing a skillet constructed in accordance with my invention and the sections assembled, Fig. 2 is a side elevation thereof, Fig. 3 is a transverse section on the line 3—3 of Fig. 1, Figs. 4 and 5 are front elevations of the respective receptacles which in their assembled relation constitute the skillet as an entirety, Fig. 6 is a front elevation, showing the receptacles partly detached and the mode of assembling and disassembling the same, and Fig. 7 is a sectional view of the handle on the line 7— of Fig. 1.

In the practical embodiment of my invention, I employ a skillet, frying pan, or the like constituted of interfitting sections 1 and 2. In the preferred embodiment of the invention, these sections are semi-circular in contour, so that when assembled the skillet as an entirety will possess a circular contour. The section 1 is provided at the upper edge of its straight side with a flange 3, provided with a depending wall 4. Adjacent to its base the section 1 has formed in its straight side a longitudinal recess 5 which is provided with an overhanging curved wall 6. Between the side of the section 1 and the depending wall 4 a space 7 is afforded for the reception in interlocking relation of an upstanding flange 8 formed longitudinally upon the straight side of the receptacle 2 and spaced away from the walls of said receptacle at the ends of said side whereby recesses 9 are afforded at each end of the receptacle 2 for the reception of the depending wall 4 of the receptacle
1. The base of these recesses extends the entire width of the receptacle 2, thereby forming a shoulder 10 upon which the end of the depending wall 4 rides in the operation of assembling the receptacles. In primarily assembling the structure the flange 8 is introduced at an angle into the recess 7 and to facilitate this mode of assemblage, the straight side of the receptacle 1 is provided in its upper portion throughout its entire width with an inclined surface 11. Adjacent to the lower portion of the section 2 an outstanding rib 12 is provided along the entire width of said section. The rib 12 is adapted to be introduced into the recess 5 of the section 1 and to this end is formed with a curved upper edge 13 with which the curved overhanging wall 6 of said recess coacts.

The above description relates to the construction of the body of the skillet and sets forth the interlocking elements thereof. The body of the skillet in the interlocked relation of its parts is reinforced or braced by supplementary handle members. The receptacle 1 is formed with a handle 14 and the receptacle 2 is formed with a handle 15. The handle sections 14 and 15 are cut away adjacent the skillet whereby in their complementary relation to form an opening 16 for the reception of a suspending device, such as a nail. The section 15 is provided adjacent the opening 16 with a shoulder 17 which terminates in a rearwardly extending ledge 18, indicated in dotted lines in Fig. 1. The ledge 18 is in a lower plane than the shoulder 17 and is adapted to bear against and overlie an extension 19 carried by the handle member 14. Opposite to the shoulder 17, the extension 19 is provided with a corresponding shoulder 20 which is spaced away from the shoulder 17, in order that a recess 21 may occur between said shoulders for the reception of a suspension nail after its introduction into the opening 16. The handle member 14 is provided with a ledge 22, illustrated in Fig. 7, which bears against an overlying extension 23 carried by the handle member 15. The ledge 22 and the extension 23 are similar in construction to the ledge 18 and the extension 19, so that the disclosure of Fig. 7 is sufficient for both of said ledges and extensions. It will thus be seen that the handle members 14 and 15 bear against one another at points along their longitudinal dimension and on relatively opposite sides, whereby the skillet is equally reinforced throughout the handle upon which the greatest strain occurs in moving the utensil from place to place.

In practical use the section 2 is introduced into engagement with the section 1, and in the initial action of this operation, said section 2 is so moved with relation to the section 1 that the extensions 19 and 23 are disposed side by side in contacting relation, whereby the respective ledges 18 and 22 are not engaged therewith. In this disposition of the sections, the receptacle 2 is tilted at an angle to the receptacle 1 and the flange 8 is introduced into the recess 7 at which time the depending wall 4 enters the recesses 9. The section 2 is then moved upon the flange 8 as a pivot until the rib 12 enters the recess 5 and the curved overhanging wall 6 interfits the concave surface 13 of said rib. When the body of the skillet has thus been assembled the section 2 is moved rearwardly until it supplements the section 1 in the formation of a circular contour therewith, at which time the ledges 18 and 22 will be in underlying relation to the respective extensions 19 and 23. In disassembling the structure, the section 2 is slid until the ledges and extensions are out of the path of one another and tilted into the position shown in Fig. 6, whereby the various interlocking elements are disengaged, at which time the receptacles may be detached.

It is obvious that various minor changes may be made in the invention without departing from the spirit and scope thereof as defined in the appended claims.

Having fully described my invention, I claim:

1. A device of the type set forth comprising independent sections having detachably interlocked engagement, each of said sections being provided at relatively different locations with laterally extending members adapted to enter into locking engagement with conformable recesses therefor, provided in the opposing section, and handle extensions carried by each of said sections and extending in parallelism so as to be capable of a relative sliding movement, said handle extensions being provided with alternately arranged laterally extending flanges and recesses, the flanges on one extension overlying the flanges of the other extension in the assembled relation of the sections as and for the purpose set forth.

2. A device of the character described comprising separate pan sections adapted to be secured together, handles carried by said sections, means carried by said pan sections for initially securing said sections against lateral movement away from each other and means carried by said handles adapted to prevent the disengagement of said first named means.

3. A device of the character described comprising separate pan sections adapted to be rigidly secured together, handles carried by said sections, means carried by said pan sections for holding said sections against lateral movement away from each other, and means carried by said handles and adapted to be operated by the relative longitudinal movement thereof adapted to prevent the disengagement of said first named means and to hold the sections rigidly together.

4. A device of the character described, comprising separable pan sections, provided with means to prevent lateral movement of said sections away from one another, said sections in the engagement of said means being adapted for a relative longitudinal sliding movement, and means provided on each of said sections and adapted to be engaged in interlocked relation upon the relative sliding movement of said sections after the engagement of said first named means, said last named means being adapted to prevent the disengagement of said first named means.

In testimony whereof I affix my signature in presence of two witnesses.

EDWARD A. HUDSON.

Witnesses:
S. E. FORBES,
F. A. LINELL.